Figures 1, 2:
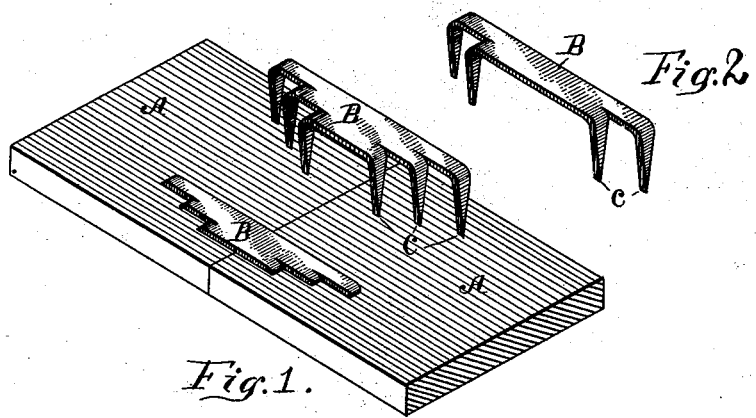

(No Model.)

C. D. FULLER.
BELT FASTENER.

No. 508,931.  Patented Nov. 21, 1893.

Witnesses:
Walter S. Wood.
Fred A. Fuller.

Inventor.
Charles D. Fuller

UNITED STATES PATENT OFFICE.

CHARLES D. FULLER, OF KALAMAZOO, MICHIGAN.

BELT-FASTENER.

SPECIFICATION forming part of Letters Patent No. 508,931, dated November 21, 1893.

Application filed June 27, 1892. Serial No. 438,208. (No model.)

*To all whom it may concern:*

Be it known that I, CHARLES D. FULLER, a citizen of the United States, residing at Kalamazoo, in the county of Kalamazoo and State of Michigan, have invented a new and useful Improvement in Belt-Hooks, of which the following is a specification.

This invention relates to that class of belt fastenings or connections, commonly known as belt hooks, and it has for its object to provide a cheap article which will make a very strong joint and prevent the ends of the belt from tearing out.

In the drawings, Figure 1 is a perspective view of the belt hook applied to the two ends of a belt. Fig. 2 is a representation of the belt hook as it would appear with one set of prongs removed for light work.

Like letters indicate corresponding parts in both figures.

Referring to the drawings, A A represent the two ends of a belt to be joined together.

B is a strip of metal with prongs or teeth C C which are bent at different distances from the center or joint line, as shown, and at right angles with the body of the hook.

In operation the two ends of the belt are brought together and laid on a piece of wood. The teeth of the hooks are then driven through the leather and clinched on the side next the pulley.

The advantages I expect to secure are a very strong joint, as the hook takes hold of four or six different places in the belt.

I am aware that a large number of staples having but a single prong on either side the joint are in use, but they are very unsatisfactory, as they pull directly on just what leather is in front of them and having but one hold, in a very short time the leather cracks from place to place where they are driven in, and the joint tears out, requiring a new short piece to be put in. In a little time this occurs again, and so on, until the belt becomes composed of many pieces before worn out, where it should be only of one.

I am also aware that solid metal pieces extending in one piece across the entire belt, or if the belt is too wide, using two or more pieces and having many prongs extending from the same are in use; also, that flat steel, with a series of teeth formed on it and used in a solid continuous row across the entire joint, is in use. I disclaim anything of this kind for the reason that while said devices hold the joint fairly well, they make it so heavy that it throws a belt out of balance, and the jar imparted to the spindle that occurs every time it passes rapidly over the pulley causes imperfect work on many fast running machines. It is to avoid this difficulty that I have constructed my fastening as above, as it is desirable to have the lightest fastening consistent with the necessary strength and welfare of the belt.

It should further be carefully noted, that by taking a firm hold of the leather at so many different places, I accomplish exactly what a double sewing of lace leather does, and like a double lace, practical tests have shown it to hold where the single lace or hooks would be utterly inadequate.

Having described my invention, what I claim, and desire to secure by Letters Patent, is—

The herein described improved belt-fastener, the same consisting of a metal plate adapted to extend across the meeting edges of a belt, said plate having one straight side and at the other side having a series of spurs arranged in pairs longitudinally opposite, the spurs of each pair being at equidistant points from the transverse center of the plate and arranged in advance of the preceding pair in both directions substantially as described, so that each pair will penetrate the belt at different transverse points, substantially as specified.

CHARLES D. FULLER.

Witnesses:
F. A. FULLER,
S. E. MEDDINS.